US011062675B2

(12) United States Patent
Leerentveld et al.

(10) Patent No.: US 11,062,675 B2
(45) Date of Patent: Jul. 13, 2021

(54) COMPENSATION FOR DISPLAY DEGRADATION WITH TEMPERATURE NORMALIZATION

(71) Applicant: Ignis Innovation Inc., Waterloo (CA)

(72) Inventors: Raymond Leerentveld, Palgrave (CA); Joe Acchione, Caledon (CA)

(73) Assignee: Ignis Innovation Inc., Waterloo (CA)

( * ) Notice: Subject to any disclaimer, the term of this patent is extended or adjusted under 35 U.S.C. 154(b) by 0 days.

(21) Appl. No.: 16/663,653

(22) Filed: Oct. 25, 2019

(65) Prior Publication Data

US 2020/0243043 A1 Jul. 30, 2020

Related U.S. Application Data

(60) Provisional application No. 62/798,127, filed on Jan. 29, 2019.

(51) Int. Cl.

| | |
|---|---|
| ***G09G 5/10*** | (2006.01) |
| ***G09G 5/00*** | (2006.01) |
| ***G06F 3/038*** | (2013.01) |
| ***G09G 3/3233*** | (2016.01) |

(52) U.S. Cl.
CPC ............. *G09G 5/10* (2013.01); *G09G 3/3233* (2013.01); *G09G 2310/027* (2013.01); *G09G 2320/0285* (2013.01); *G09G 2320/041* (2013.01); *G09G 2320/045* (2013.01)

(58) Field of Classification Search
CPC ........................... G09G 3/3233; G09G 3/3225
See application file for complete search history.

(56) References Cited

U.S. PATENT DOCUMENTS

| | | | | |
|---|---|---|---|---|
| 2001/0055007 A1* | 12/2001 | Miura | G09G 3/3611 | 345/204 |
| 2002/0041278 A1* | 4/2002 | Matsueda | G09G 3/20 | 345/204 |
| 2018/0182278 A1* | 6/2018 | Kim | G09G 3/2018 | |
| 2019/0052872 A1* | 2/2019 | Shyshkin | H04N 17/04 | |

* cited by examiner

*Primary Examiner* — Nan-Ying Yang
(74) *Attorney, Agent, or Firm* — Stratford Managers Corporation

(57) ABSTRACT

Systems and methods for correcting non-uniformity and for compensating for display OLED degradation utilize a correction factors k for each pixel, which is modelled and tracked based on grey level and a pixel parameter, such as temperature and time. The correction factor k is used to correct image data provided to an OLED display. To improve display uniformity for active matrix organic light emitting diode devices (AMOLED) and other emissive displays the panel luminance is a based on operating temperature, whereby the aging effect on a compensation parameter is independent of temperature.

20 Claims, 6 Drawing Sheets

450

COMPENSATION FOR DISPLAY DEGRADATION WITH TEMPERATURE NORMALIZATION

CROSS-REFERENCE TO RELATED APPLICATIONS

This application claims priority to U.S. Provisional Application No. 62/798,127, filed Jan. 29, 2019, which is hereby incorporated by reference herein in its entirety.

FIELD OF THE INVENTION

The present disclosure relates to compensation of light emissive visual display panel technology, and in particular to improving display uniformity for active matrix organic light emitting diode device (AMOLED) and other emissive displays by adjusting the panel luminance based on operating temperature, whereby the aging effect on a compensation parameter is independent of temperature.

BRIEF SUMMARY

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
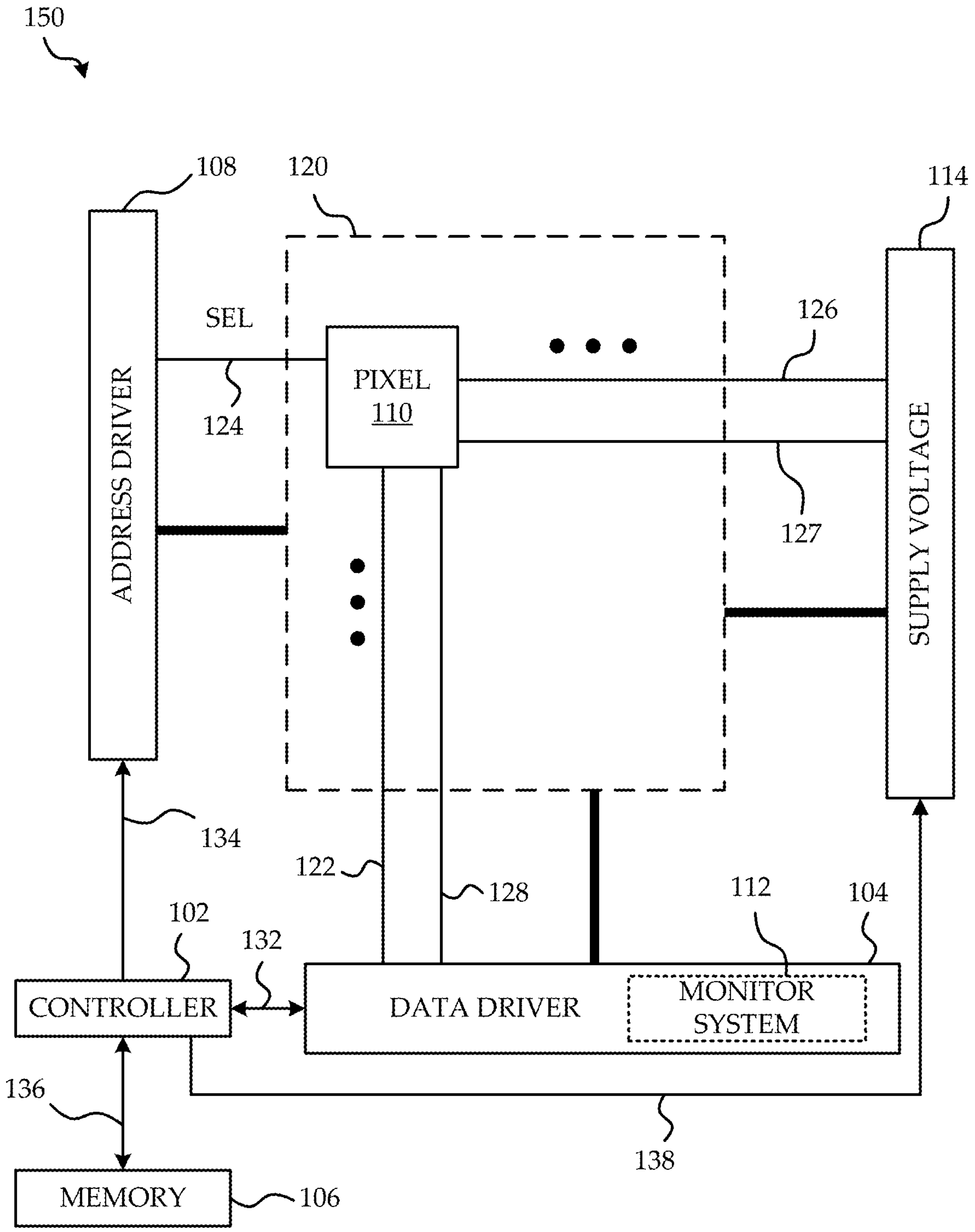
FIG. 1 illustrates an example display system which participates in and whose pixels are corrected by the degradation compensation systems and methods disclosed.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

An OLED device is a Light Emitting Diode (LED) device in which an emissive electroluminescent layer comprises a film of organic compound that emits light in response to an electric current. The layer of organic material is situated between two electrodes; typically, at least one of these electrodes is transparent. Compared to conventional Liquid Crystal Displays (LCDs), Active Matrix Organic Light Emitting Device (AMOLED) displays offer lower power consumption, manufacturing flexibility, faster response time, larger viewing angles, higher contrast, lighter weight and amenability to flexible substrates. An AMOLED display works without a backlight because it emits visible light, and each pixel may comprise different colored OLEDs emitting light independently. Accordingly, the OLED panel can display deep black level and can be thinner than an LCD display.

Many modern display technologies suffer from defects, variations, and non-uniformities, from the moment of fabrication, and can suffer further from aging and deterioration over the operational lifetime of the display, which result in the production of images which deviate from those which are intended. Optical correction systems and methods can be used, either during fabrication or after a display has been put into use, to measure and correct pixels (and sub-pixels) across the display. To correct for visual defects of the display, the incoming video signal is deliberately modified with compensation data or correction data such that it compensates for those defects. In some approaches, to determine the correction data, first the luminance of each individual panel pixel is measured for a number of greyscale luminance values, and correction values based on producing a desired luminance for each pixel are then determined. Other approaches utilize a combination of one or more of electrical measurements, luminance measurements, and known pixel characteristics along with appropriate algorithms to predict correction values which produce desired luminance. One of the major visual defects of display technologies is non-uniformity across the display, which is perceivable as luminosity or color variations across portions of images that should appear as a flat field.

AMOLED panels in particular are characterized by significant amounts of luminance non-uniformity caused by multiple factors including, TFT threshold variation, OLED voltage and luminance variation, manufacturing tolerances, voltage drop along lines, temperature variation, and contamination and driver output differences, among others. Several measurement technologies may be used to measure the drive in OLED displays and algorithms may be utilized to take these combined effects and correct the image on the display by changing the offset and gain of individual pixels. As described further below, the measurement data used to generate the correction data and correction function can either be collected optically or electrically on the panel. The correction data according to the methods developed and defined herein are applicable for both initial T0 (Time Zero) and Tn (Time after Time Zero) corrections. The offset method for uniformity correction outlined below describes how the measured data are utilized to create offset data which is used in a correction function to generate uniform corrected pixel output.

It should be understood that while the embodiments herein have been described in the context of AMOLED displays, the embodiments herein pertain to methods of uniformity correction and compensation and do not limit the display technology underlying their operation and the operation of the displays in which they are implemented. The methods described herein are applicable to any number of various types and implementations of various visual display technologies comprising pixels, including but not limited to light emitting diode displays (LED), electroluminescent displays (ELD), organic light emitting diode displays (OLED), plasma display panels (PSP), microLED or quantum dot displays, among other displays. To facilitate image correction, for a given display after singularization, methods such In-Pixel Compensation (IPC) or electrical measurement or a combination of both IPC compensation and electrical measurement, may also be used to acquire the correction data. The correction data is then stored on a Non-Volatile Memory (NVM) chip inside the display system and final product as initial correction data for later processing and updating as and when further degradation occurs.

FIG. 1 illustrates an example display system 150 whose degradation is to be compensated and whose images are to be corrected with the systems and methods described further below. The display system 150 includes a display panel 120, an address driver 108, a data driver 104, a controller 102, and a memory storage 106.

The display panel 120 includes an array of pixels 110 (only one explicitly shown) arranged in rows and columns. Each of the pixels 110 is individually programmable to emit light with individually programmable luminance values. The controller 102 receives digital data indicative of information to be displayed on the display panel 120. The controller 102 sends signals 132 to the data driver 104 and scheduling signals 134 to the address driver 108 to drive the pixels 110 in the display panel 120 to display the information indicated. The plurality of pixels 110 of the display panel 120 thus comprise a display array or display screen adapted to dynamically display information according to the input digital data received by the controller 102. The display screen and various subsets of its pixels define "display areas" which may be used for monitoring and managing display brightness. The display screen can display images and streams of video information from data received by the controller 102. The supply voltage 114 provides a constant power voltage or can serve as an adjustable voltage supply that is controlled by signals from the controller 102. The display system 150 can also incorporate features from a current source or sink (not shown) to provide biasing currents to the pixels 110 in the display panel 120 to thereby decrease programming time for the pixels 110.

For illustrative purposes, only one pixel 110 is explicitly shown in the display system 150 in FIG. 1. It is understood that the display system 150 is implemented with a display screen that includes an array of a plurality of pixels, such as the pixel 110, and that the display screen is not limited to a particular number of rows and columns of pixels. For example, the display system 150 can be implemented with a display screen with a number of rows and columns of pixels commonly available in displays for mobile devices, monitor-based devices, and/or projection-devices. In a multichannel or color display, a number of different types of pixels, each responsible for reproducing color of a particular channel or color such as red, green, or blue, will be present in the display. Pixels of this kind may also be referred to as "subpixels" as a group of them collectively provide a desired color at a particular row and column of the display, which group of subpixels may collectively also be referred to as a "pixel".

The pixel 110 is operated by a driving circuit or pixel circuit that generally includes a driving transistor and a light emitting device. Hereinafter the pixel 110 may refer to the pixel circuit. The light emitting device can optionally be an organic light emitting diode, but implementations of the present disclosure apply to pixel circuits having other electroluminescence devices which may be subject to similar degradation, including current-driven light emitting devices. The driving transistor in the pixel 110 can optionally be an n-type or p-type amorphous silicon thin-film transistor, but implementations of the present disclosure are not limited to pixel circuits having a particular polarity of transistor or only to pixel circuits having thin-film transistors. The pixel circuit 110 can also include a storage capacitor for storing programming information and allowing the pixel circuit 110 to drive the light emitting device after being addressed. Thus, the display panel 120 can be an active matrix display array.

As illustrated in FIG. 1, the pixel 110 illustrated as the top-left pixel in the display panel 120 may be coupled to a select line 124, a supply line 126, a data line 122, and a monitor line 128. A read line may also be included for controlling connections to the monitor line 128. In one implementation, the supply voltage 114 may also provide a second supply line to the pixel 110. For example, each pixel 110 may be coupled to the first supply line 126 charged with Vdd and a second supply line 127 coupled with Vss, and the pixel circuits for the pixels 110 may be connected between the first and second supply lines 126 and 127 to facilitate driving current between the first and second supply lines 126 and 127 during an emission phase of each pixel circuit. It is to be understood that each of the pixels 110 in the pixel array of the display panel 120 may be coupled to appropriate corresponding select lines 124, supply lines 126, data lines 122, and monitor lines 128. Aspects of the present disclosure may apply to pixels having additional connections, such as connections to additional select lines, and to pixels having fewer connections.

With reference to the pixel 110 of the display panel 120, the select line 124 is provided by the address driver 108, and may be utilized to enable, for example, a programming operation of the pixel 110 by activating a switch or transistor to enable the data line 122 to program the pixel 110. The data line 122 conveys programming information from the data driver 104 to the pixel 110. For example, each data line 122 may be utilized to apply a programming voltage or a programming current to each pixel 110 in order to program each pixel 110 to emit a desired amount of luminance. The programming voltage (or programming current) supplied by the data driver 104 via the data line 122 is a voltage (or current) appropriate to cause the pixel 110 to emit light with a desired amount of luminance according to the digital data received by the controller 102. The programming voltage (or programming current) may be applied to the pixel 110 during a programming operation of the pixel 110 so as to charge a storage device within the pixel 110, such as a storage capacitor, thereby enabling the pixel 110 to emit light with the desired amount of luminance during an emission operation following the programming operation. For example, the storage device in the pixel 110 may be charged during a programming operation to apply a voltage to one or more of a gate or a source terminal of the driving transistor during the emission operation, thereby causing the driving transistor to convey the driving current through the light emitting device according to the voltage stored on the storage device.

Generally, in the pixel 110, the driving current that is conveyed through the light emitting device by the driving transistor during the emission operation of the pixel 110 is a current that is supplied by the first supply line 126 and is drained to a second supply line 127. The first supply line 126 and the second supply line 127 are coupled to the supply voltage 114. The first supply line 126 may provide a positive supply voltage, e.g. a voltage commonly referred to in circuit design as "Vdd", and the second supply line 127 may provide a negative supply voltage, e.g. a voltage commonly referred to in circuit design as "Vss". Implementations of the present disclosure may be realized where one or the other of the supply lines, e.g. the second supply line 127, is fixed at a ground voltage or at another reference voltage.

The display system 150 may also include a monitoring system 112. With reference again to the pixel 110 of the display panel 120, the monitor line 128 connects the pixel 110 to the monitoring system 112. The monitoring system 12 may be integrated with the data driver 104 or may be a separate stand-alone system. In particular, the monitoring system 112 may optionally be implemented by monitoring the current and/or voltage of the data line 122 during a monitoring operation of the pixel 110, whereby the monitor line 128 may be entirely omitted. The monitor line 128 enables the monitoring system 112 to measure a current or a voltage associated with the pixel 110 and thereby extract information indicative of a degradation or aging of the pixel 110 or indicative of a temperature of the pixel 110. In some embodiments, the display panel 120 includes temperature sensing circuitry devoted to sensing temperature implemented in the pixels 110. In some embodiments the temperature sensing circuitry of the display panel 120 measures temperature on a pixel-by-pixel basis, while in others it determines coarse local temperatures for a number of display areas, while in others, it determines a single global temperature of the display panel 120. In other embodiments, the pixels 110 comprise circuitry which participates in both sensing temperature and driving the pixels. For example, the monitoring system 112 may extract, via the monitor line 128, a current flowing through the driving transistor within the pixel 110 and thereby determine, based on the measured current and based on the voltages applied to the driving transistor during the measurement, a threshold voltage of the driving transistor or a shift thereof. The compensation may be based on having an elapsed time counter for each pixel 110, group of pixels 110 or display panel 120, for measuring the time at given stress levels or based on a measurement of voltage of current changes of the pixel 110 at a specific bias condition.

The controller 102 and the memory 106 together or also in combination with a correction block (not shown in FIG. 1) use compensation data or correction data, in order to address and correct for the various defects, variations, and non-uniformities, existing at the time of fabrication, and defects suffered further from aging and deterioration after usage. In some embodiments, the correction data includes data for correcting the luminance of the pixels obtained through OLED degradation tracking and modelling using a compensation system as described below, while in other embodiments OLED degradation is applied to the image data prior to its being provided in the memory 106. Some embodiments employ the monitoring system 112 to characterize the behavior of the pixels 110 and to continue to monitor aging and deterioration as the display ages and to update the correction data to compensate for said aging and deterioration over time. Some embodiments the combine compensation performed by the monitoring system 112 and the controller 102 with the degradation compensation performed by the compensation system 200 described below while in other embodiments only the compensation system 200 performs any degradation compensation.

Figure 2:
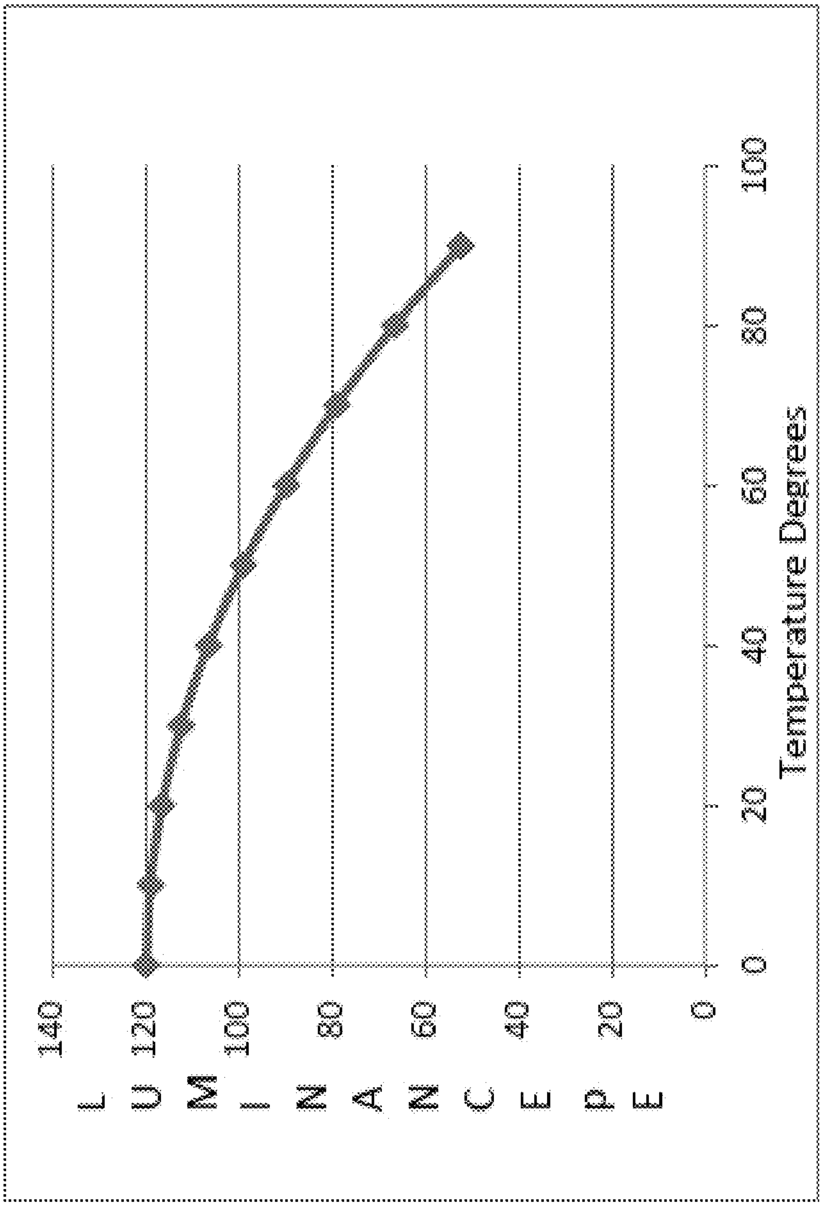
FIG. 2 illustrates an example temperature compensating curve.

In a preferred embodiment, the temperature sensing circuitry may be used, in conjunction with the controller 102 and the data driver 104, to adjust the maximum luminance of each pixel 110 based on the operating temperature, e.g. the individual pixel temperature, an area (a group of pixels) temperature, an overall global temperature of the display 120, based on a predetermined temperature compensating curve. The temperature sensing circuity may be configured to generate signals corresponding to temperature readings after each predetermined time period at a predetermined time interval, e.g. between 0 seconds to 1 second, preferably between 0 sec and 5 sec. Varying the maximum luminance available to each pixel based on operating temperature would ensure that the aging effect on the compensation parameter, i.e. pixel parameter such as time or drive current (voltage) shift, would result in uniform aging and corresponding correction factors independent of temperature. An example temperature compensating curve is illustrated in FIG. 2, whereby at a lower temperature limit, e.g. 0° C., the maximum luminance of predetermined pixels is increased by a set amount or percentage, e.g. 120% of standard peak luminance, and at an upper temperature limit, e.g. 80° C., the maximum luminance of predetermined pixels is decreased by a set amount or percentage, e.g. 66.66% of standard peak luminance or for an upper temperature limit, e.g. 90° C., the maximum luminance of predetermined pixels is decreased by a set amount or percentage, e.g. 50% of standard peak luminance. The temperature compensating curve may be linear or curvilinear, e.g. logarithmic, with the change in luminance decreasing more rapidly as temperature increases.

Figure 3:
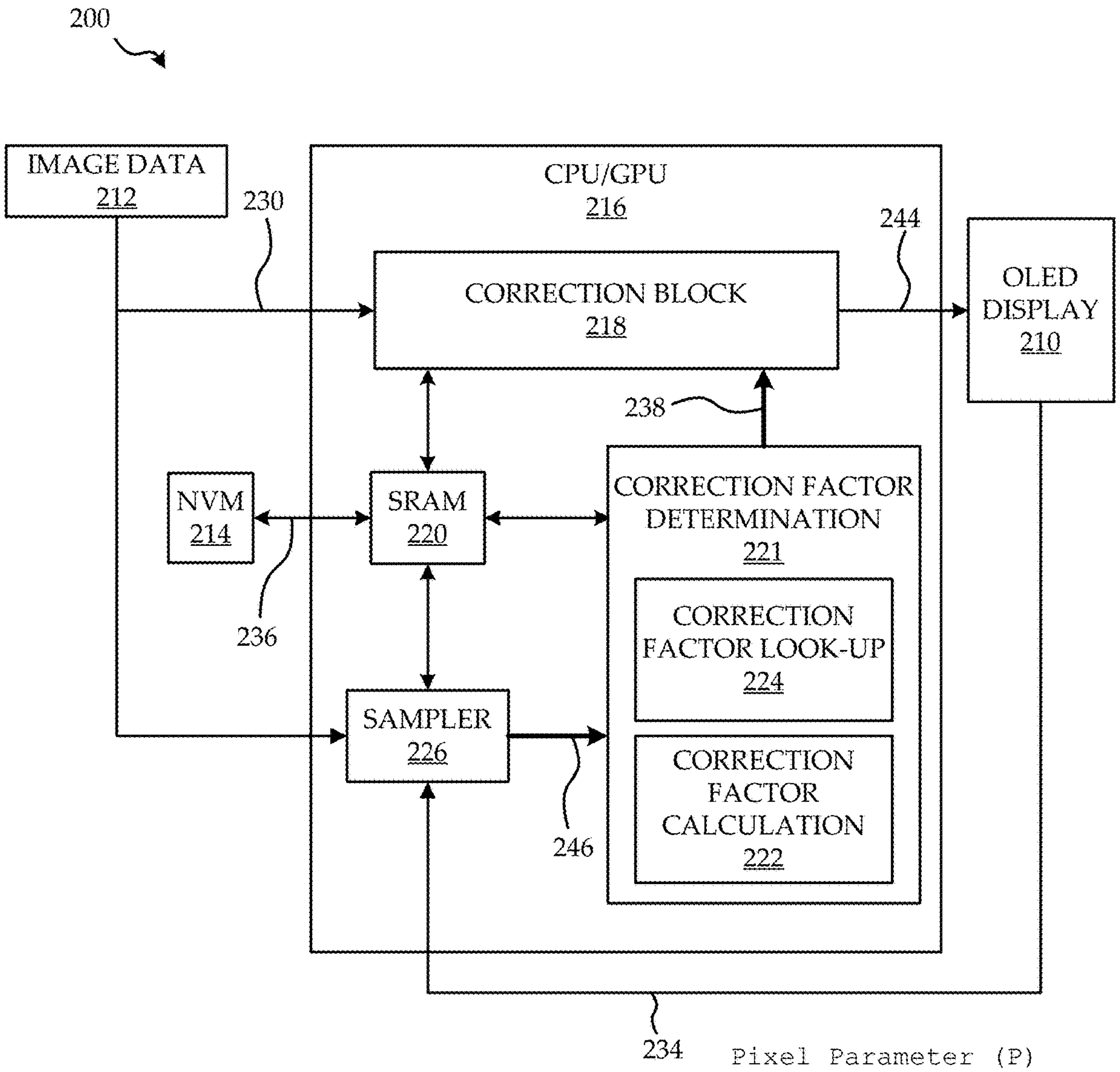
FIG. 3 is a schematic block diagram of an OLED degradation compensation system in accordance with an embodiment.

Referring to FIG. 3, a compensation system 200 for display degradation may be provided in the monitor system 112, the data driver 104 or some other suitable location in the display system 150. The compensation system 200 for the display system 210, e.g. display system 150, which is to be corrected, includes a central or graphics processing unit 216, e.g. controller 102, as well as an image data block 212, e.g. data driver 104, which generates or receives the images to be displayed, and a non-volatile memory (NVM) 214, e.g. memory 106, such as NAND flash memory. The NVM 214 may be implemented in the non-volatile memory of a host device, in which the correction system 200 is implemented. The central or graphics processing unit 216 can comprise, for example, a CPU or a GPU of the host device or system in which the OLED display 210 is implemented. Such a host device or system could be, for example, a mobile device, phone, laptop, tablet, desktop, or TV. In another case, the processing unit 216 can be part of the display system 150 and/or the controller 102 illustrated in FIG. 1, for example, integrated in a timing controller TCON. In some implementations, the OLED display 210 of FIG. 2 may correspond more or less to the display system 150 of FIG. 1 and includes similar components thereof. In some embodiments, the processing unit 216 may be external to the display system 150, illustrated in FIG. 1 and provide corrected image data 244 to memory 106 as the image data referred to hereinabove with respect to FIG. 1.

The processing unit 216 may include an SRAM memory 220, as well as a plurality of functional blocks which may be implemented with software, firmware, or specialized hardware of the processing unit 216. The functional blocks may include a sampler 226, a correction block 218, and a correction factor determination unit 221, which includes a correction factor lookup unit 224 and a correction factor calculation unit 222. As illustrated in FIG. 3, each of the functional blocks of the processing unit 216 may have access to the SRAM 220 for storing and retrieving any of the data utilized in the compensation process, as and when needed.

Image data 230 which is generated or received at the image data block 212 and comprise images intended for display on the OLED display 210, are processed by the correction block 218 of the processing unit 216 utilizing correction factors 238 (described below) to generate corrected image data 244 for display by the OLED display 210. The corrected image data 244 compensates for OLED degradation of the sub-pixels of the OLED display 210.

Correction factors k for each sub-pixel of the OLED display 210 are stored in persistent storage, such as non-volatile memory 214, in order to keep record of the degradation of the OLED display 210 over successive power up and shut down of the host device or system in which the compensation system 200 is implemented. In some embodiments, correction factors k are stored for each and every subpixel in a lookup table. The lookup table may be stored in the SRAM 220 of the processing unit 216 while the correction system 200 is in operation and may also be stored in the NVM 214 for persistent storage while the correction system 200 is powered down. On power-up, the previously stored correction factors k may be loaded from the NVM 214 to the SRAM 220 as starting k values which are periodically updated. In some embodiments, the display device or the display system 210 may start with correction factors k prepopulated from the factory in the NVM 214.

In order to track OLED degradation of each sub-pixel of the OLED display 210 in accordance with the model described below, while in operation, and sampler 226 of the processing unit 216 may periodically sample grey scale or grey level data of the image data 230 from the image data block 212 intended for the sub-pixels of the OLED display 210. The sampler 226 also has access to a pixel parameter 234, e.g. time, drive current (voltage), drive current (voltage) shift or temperature, originating from the OLED display 210 which the sampler 226 periodically samples. In some embodiments, the pixel parameter data is provided for each and every subpixel, while in other embodiments the same pixel parameter data (P) 226 applies to a plurality of the sub-pixels in each display area or, in the case where the pixel parameter data (P) 234 is a single global pixel parameter, applies to all of the sub-pixels. The sampler 226 provides sampled grey level and pixel parameter data (sampled data 246) to the correction factor determination unit 221 which performs the necessary calculations to generate the correction factor k including integration or summation according to the model described below.

Once provided with the sampled data 248, the correction factor calculation unit 222 calculates the new correction factor k by obtaining the currently stored k factor and adding to it according to the model. As described below, the calculation of the new correction factor k may depend upon the grey level data (GL) and the pixel parameter data (P), e.g. time (t) or temperature (T), the last of which the correction factor calculation unit has independent access to. In some embodiments, the currently stored k factor for a particular sub-pixel is obtained from the look up table in SRAM 220 using the correction factor look-up unit 224. Once the new correction factor k is determined it may be stored in SRAM 220, and it also may be stored in the NVM 214. In some embodiments, any updates to the correction factors in SRAM 220 is mirrored in the NVM 214 in order to keep the persistent correction factors current. In other embodiments the NVM 214 is updated with the current correction factors in SRAM 220 immediately prior to the host device or system being powered down.

The correction block 218 utilizes the correction factors k for every sub-pixel in its correction of the image data 230 into corrected image data 244 provided to the OLED display 210. In some embodiments the correction block 218 utilizes the correction factor look-up unit 224 to fetch the current correction factor k 218 for the sub-pixel whose data it is currently correcting. In other embodiments, the current correction factors are directly obtained from SRAM 220.

In some embodiments the correction unit 216 utilizes the correction factor multiplicatively to generate the corrected image data 244. In some embodiments the corrected grey level for each sub-pixel in the corrected image data 244 is generated by the correction unit 216, by multiplying the original grey level for each sub-pixel in the image data 230 by a function of the corresponding correction factor k of the sub-pixel. In some embodiments this function is non-linear.

In some embodiments, the correction factor look-up unit 224 includes functionality to look-up additional look-up tables for optimizing the calculation of the correction factors according to the model. In these embodiments, the functional dependence of the correction factor k upon the sampled data (grey level GL, pixel parameter P, and/or time t) are stored in a look-up table to reduce processing computation of the correction factors k. In such an embodiment, the correction factor calculation unit 222 uses the correction factor look-up unit and the sampled grey level and temperature data, and its own tracking of time, to fetch the values of $F_1$, $F_2$, and $F_3$ (see below) from which it calculates the value of correction factor k, or to directly fetch the correction factor k.

In some embodiments, the frequency of access of the correction factors k by the correction block 218 exceeds the frequency of calculation and update of the correction factors k by the sampler 226 working in tandem with the correction factor determination unit 221. In such embodiments, the correction block 218 accesses the current correction factor k each time it is needed independently of when the correction factors are updated by the correction factor determination unit 221.

The correction factor determination unit 221 determines the correction factor k, according to an OLED degradation correction model in which the correction factor k is proportional to the overall sum of stress energy that an OLED endures during the time period from $t_i$ to $t_n$. An example model is as follows:

$$k \propto E_{OLED} \tag{1}$$

Here, the OLED energy $E_{OLED}$ is the accumulation of the product of the OLED voltage, $V_{OLED}$, and the OLED driving current, $I_{OLED}$:

$$E_{OLD} = \int_{t_i}^{tn} P_{OLED}(t)dt = \int_{t_i}^{tn} (I_{OLED}(t) \times V_{OLED}(t,P))dt \tag{2}$$

As illustrated in formula (2), $P_{OLED}$ represents the instantaneous power of the OLED and P represents the operating parameter, e.g. temperature, of the OLED.

The OLED voltage $V_{OLED}$ can vary during the period as can the magnitude of the driving current $I_{OLED}$. An empirical model of equation (2) is provided such that the correction factor k is proportional to the accumulated stress Grey Level (GL) and time with mathematical functions as follows:

$$k \propto F(GL,t,T) \tag{3}$$

$$k \propto \Sigma F_1(GL) \times F_2(t) \times F_3(T) \tag{4}$$

Where, $F_1(GL)$, $F_2$ (t) and $F_3$ (T) represent the function of OLED driving current, the function of time and the function of temperature in which an OLED is operating respectively. In some embodiments, $F_1(GL)$ is of the form $A^*(GL)^\gamma$, for example, where γ is the intensity gamma curve for the OLED display, while in others $F_1(GL)$ is a polynomial of GL. In some embodiments, $F_2(t)$ is a polynomial of t. In some embodiments, $F_3(T)$ is of the form $C^*T/T_0$, in others a polynomial of T, and in others a polynomial of $[-C^*\exp(1/T-1/T_0)]$ where $T_0$ is a predetermined reference temperature.

In embodiments which utilize a look-up table for computation of the correction factor k or each of $F_1$, $F_2$, and $F_3$, the correction factor calculation unit 222 utilizes the correction factor look-up unit 224 to fetch the relevant value using GL, t, and T In other embodiments, the value of k is computed by integration or summation along with calculations of the product of the appropriate functional forms of $F_1$, $F_2$, and $F_3$.

Although the algorithms or processes described above have been described separately, it should be understood that any two or more of the algorithms or processes disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Also, some or all of the machine-readable instructions represented in process described herein can be implemented manually as opposed to automatically by a controller, processor, or similar computing device or machine. Further, although specific algorithms or processes have been described, persons of ordinary skill in the art will readily appreciate that many other methods of implementing the example machine readable instructions may alternatively be used. For example, the order of execution of the steps may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

Figure 4:
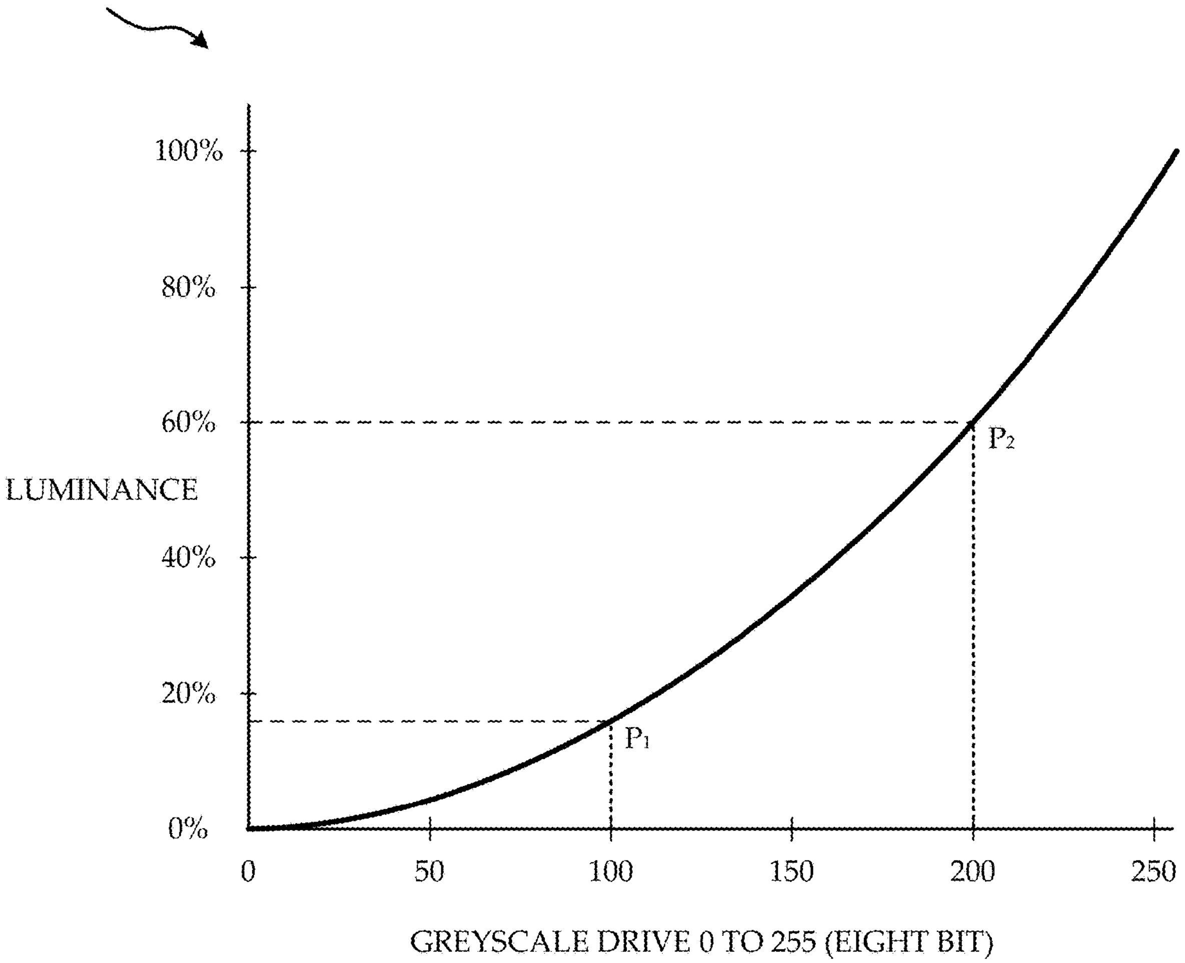
FIG. 4 illustrates a typical response curve of a pixel.

Referring to FIG. 4, a typical pixel luminance response curve 450 will now briefly be described. A typical pixel 110 of an emissive display panel 120 produces a specific amount of luminance in response to being programmed or driven with a specific greyscale drive level. In systems where 8-bit greyscale values are utilized, the number of greyscale drive levels total 256, namely, 0 to 255. It is to be understood that the methods described herein are equally applicable to display systems utilizing a different number of bits per channel. The luminance produced from these greyscale drive levels, increases from a lower bound of luminance (0%) to some upper bound luminance level (100%) attainable by the pixel as the greyscale drive levels range from 0 to 255. As indicated in the curve of FIG. 2, generally, the pixel luminance response curve 450, rather than being linear, follows a desired gamma function, for example, a gamma of 1.8 or 2.2.

Figure 5:
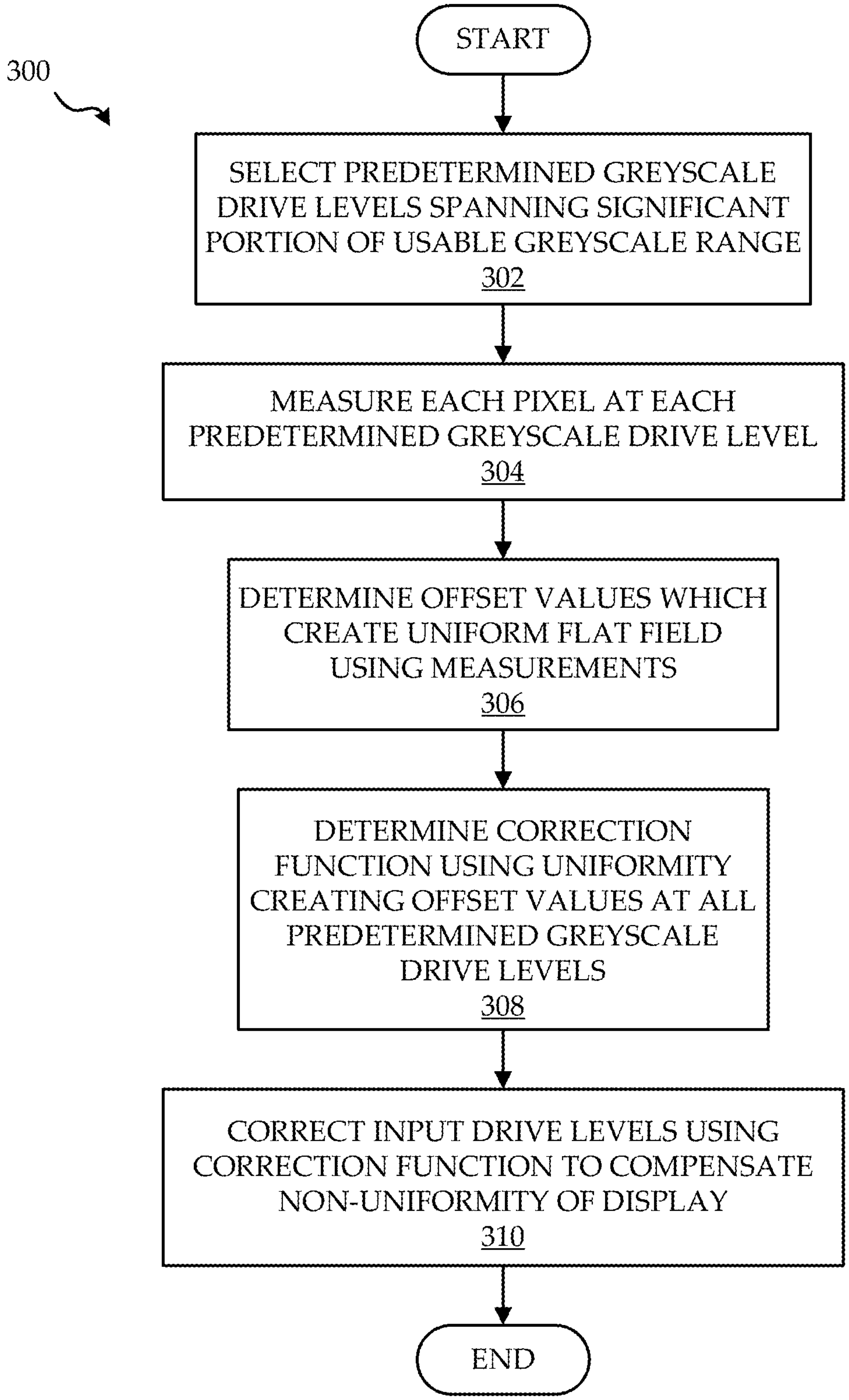
FIG. 5 is a high-level functional block diagram of pixel offset uniformity correction.

With reference to FIG. 5, a pixel offset method of uniformity correction 300 will now be described. A number of predetermined greyscale drive levels ($P_N$) which represent a significant portion of the usable greyscale range on a display panel are selected 302. For example, FIG. 4 depicts two such points $P_1$ and $P_2$ which are at the 100 and 200 greyscale drive level respectively. Although only two predetermined greyscale drive levels are illustrated, in general any number of predetermined greyscale drive levels may be selected. Also, different greyscale drive levels, as long as they span and represent a significant portion of the usable range, may be utilized.

Each pixel 110 is then driven and measured at each predetermined greyscale drive level in step 304. In some embodiments each pixel's luminance is measured optically while being driven at the predetermined levels, such as by an external optical measuring system such as a camera or by integrated optical detectors such as photodiodes. In other embodiments, a current output of each pixel is measured electrically with use of a monitoring system, while being driven at the predetermined greyscale drive levels. In other embodiments a combination of optical and electrical measurement is utilized.

Offset values which create a uniform flat field are determined from such measurements previously taken or are determined in conjunction with the taking of such measurements in step 306. The offset value for each pixel at each predetermined greyscale drive level is the deviation in greyscale drive level from that predetermined greyscale drive level for that pixel which is required for the pixels collectively to produce a uniform flat field. Since the offset values which produce a uniform flat field are relative in nature, being determined from the context of all the pixels producing the uniform flat field, any problems which arise from independently attempting to correct each pixel towards some absolute desirable luminance value, which may or may not be attainable by all the pixels, are mitigated and/or avoided. The criteria for what constitute a uniform flat field can be defined optically in terms of luminance uniformity or based solely on the electrical measurements, e.g. uniformity in the drive current measured electrically.

In some embodiments, the optical and/or electrical measurements of the pixels from the previous step 304 are utilized (optionally in conjunction with known characteristics of the pixels and/or with use of algorithms) to determine what offset values are required for each pixel at each predetermined greyscale drive level to create a uniform flat field. In other embodiments, an iterative approach is utilized. In embodiments with an iterative approach, greyscale drive levels of each pixel are repeatedly varied away from the predetermined drive levels while measuring the pixels in step 304, either optically, electrically, or both, until reaching a uniform flat field, the final pixel offset values being those determined to produce the uniform flat field in step 306. In either approach, this process results in one array of offsets spanning all the pixels 110 of the display panel 120, for each predetermined greyscale drive level. It should be noted that due to the offset values' relatively small magnitude, the number of bits required to store offset values for each of the predetermined greyscale drive levels is smaller than what would otherwise be required for storing the uniformity creating greyscale drive level.

For example, in an embodiment with two predetermined greyscale drive levels, such as that illustrated in FIG. 2, the relationship between the uniformity creating drive level (U) and the pixel offset value (0) for each predetermined grayscale drive levels $P_1$ and $P_2$ are as follows:

$$P_1+O_1=U_{-1} \quad (1)$$

$$P_2+O_2=U_2 \quad (2)$$

Where $O_1$ is the required offset value to the greyscale drive level at predetermined greyscale drive level $P_1$ for the pixel to generate a uniform flat field, which is attained with a uniformity corrected drive level $U_1$ and $O_2$ is the required offset to the greyscale drive level at predetermined greyscale drive level $P_2$ for the pixel to generate a uniform flat field, which is attained with a uniformity corrected drive level $U_2$.

Once the uniformity generating offsets for each pixel are determined in step 306 and stored in the respective arrays, a correction function for each pixel is determined from them 308 and this function is utilized to correct video data in a manner which compensates the non-uniformity of the display panel 310. Since very few pixels at any one time are being driven exactly at any one of the predetermined greyscale drive levels, some function which interpolates and extrapolates the correction for application to any greyscale drive level of a pixel, is desirable.

Figure 6:
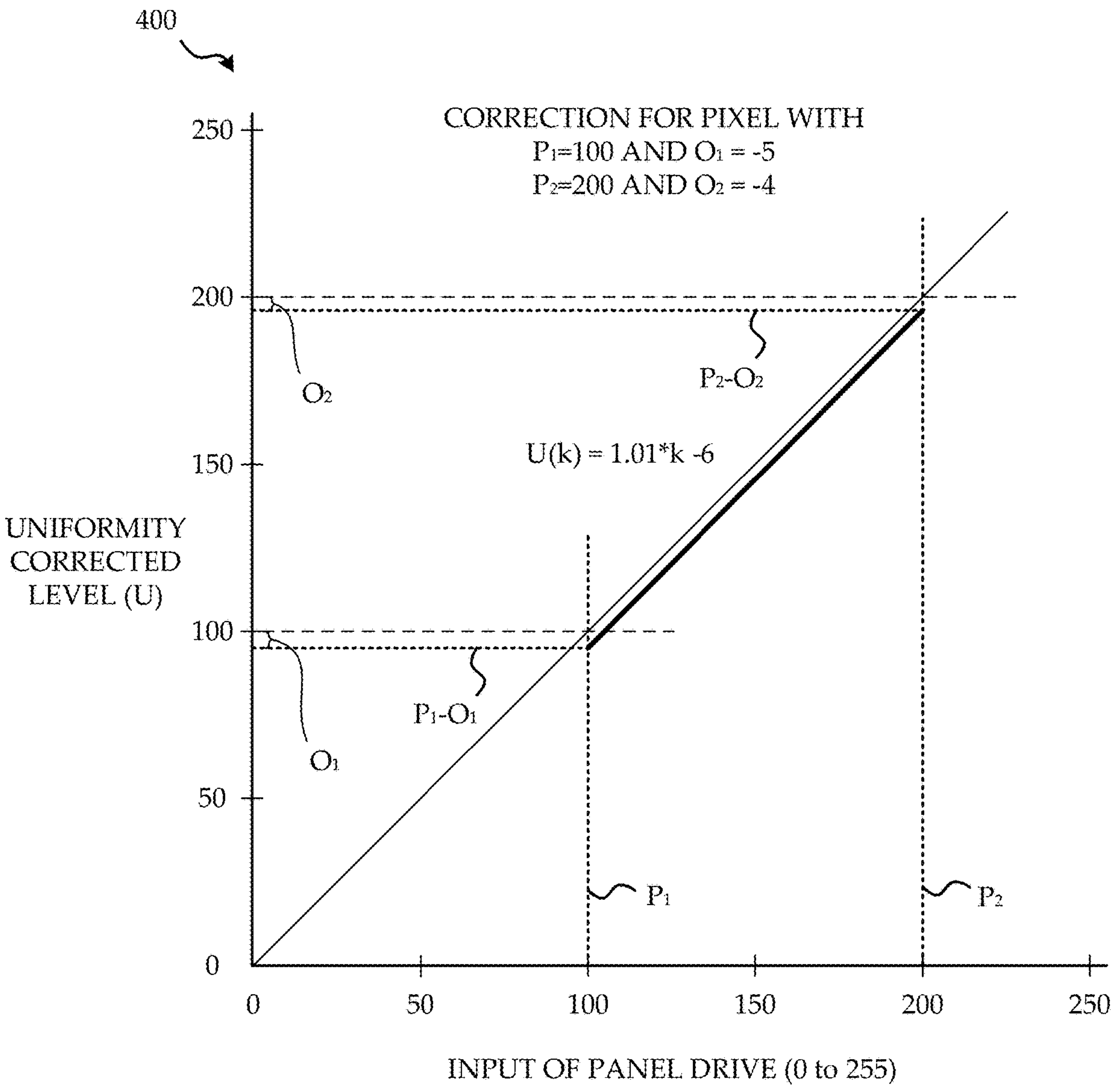
FIG. 6 illustrates linear uniformity compensation using a correction function according to the pixel offset embodiment of FIG. 5.

With reference also to FIG. 6, a uniformity correction function U(k) 400, of the method of FIG. 5 will now be discussed. The example of FIG. 6 illustrates a linear uniformity correction function U(k) 400 determined from an embodiment for which two predetermined greyscale levels $P_1$ and $P_2$, such as those illustrated in FIG. 4, have been selected. At the first predetermined greyscale drive level $P_1=100$, it is determined in steps 304 and 306 that an offset $O_1$ equal to −5 is required for that pixel to contribute to a uniform flat field, while at the second predetermined greyscale drive level $P_2=200$, it is determined in steps 304 and 306 that an offset $O_2$ equal to −4 is required for the pixel to contribute to a uniform flat field.

As described above, the uniformity correction function U(k) preferably provides a uniformity corrected drive level for every possible input greyscale drive level k. For an embodiment which utilizes two predetermined greyscale drive levels, and hence stores two offset values for each pixel, a linear function which has as its parameters these offsets and the input drive level k may be determined as follows:

$$U(k)=B*k+C \quad (3)$$

Where B is defined as the slope or gain of the linear uniformity correction function U(k) 400 and obtained by:

$$B=((P_2+O_2)-(P_1+O_1))/(P_2-P_1)=(100+O_2-O_1)/100 \quad (4)$$

and where C is defined as the offset of the linear uniformity correction function U(k) 400 and obtained by:

$$C=(P_1+O_1)-B*P_1=100+O_1-100-O_2+O_1=2O_1-O_2 \quad (5)$$

In the specific case illustrated in FIG. 4, the linear uniformity correction function U(k) therefore is:

$$U(k)=(100+O_2-O_1)*k/100+2O_1-O_2 \quad (6)$$

Which for the specific offsets $O_1=-5$ and $I_2=-4$ is evaluated to:

$$U(k)=1.01*k-6 \quad (7)$$

In some embodiments, after a sufficient usage of the display, the pixels 110 are measured again, new offsets are determined in steps 304 and 306, and the offsets are used to determine the correction function U(k) 308.

For each pixel 110, the uniformity correction function U(k) 400 thus represents the linearly extrapolated and interpolated uniformity corrected level for any input greyscale drive level k, using only the stored offsets for the pixel and k as inputs. This function is used to correct the input greyscale drive values to generate greyscale drive values which provide improved uniformity, thereby compensating for non-uniformity of the display 310.

As described above, the number of predetermined greyscale drive levels may be greater than two and may be any number which spans a significant portion of the usable greyscale drive range. For embodiments where the number of predetermined greyscale drive levels N is greater than two in order to account for additional non-linearity in the non-uniformity of the pixel's response, rather than a single linear uniformity creating correction function, a piecewise linear curve fitting may be utilized. In such a case the uniformity correction function U(k) is piecewise linear and expressed only as a function of the offsets $O_1, \ldots O_N$, and the input greyscale drive level, in a manner analogous to that described for the embodiment associated with FIG. 4, but for each "piece" of the piecewise uniformity correction function.

Alternatively, the multiple points $(P_1-O_1, P_1), \ldots (P_N-O_N, P_N))$ determined for an embodiment with N predetermined greyscale levels, may be utilized to generate a curve-fit polynomial, generally of any order between 1 and N−1. In such a case, the determined points generating the curve-fit function are expressed in terms of the offsets, so that the generated polynomial function for each pixel is a function which only requires the offsets for the pixel, obtained from the stored arrays, and the input greyscale drive level k for the pixel, as inputs to generate the uniformity creating greyscale drive level.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of compensating for non-uniformity of an emissive display panel comprising pixels, each pixel including an organic light-emitting device (OLED), the method comprising:

determining an operating temperature of at least one of the pixels periodically at a predetermined time interval;

increasing a maximum luminance at temperatures above a standard temperature, and decreasing the maximum luminance at temperatures below the standard temperature for the at least one pixel periodically dependent upon the operating temperature based on a predetermined temperature compensating curve resulting in uniform aging of the at least one pixels;

storing for each pixel a correction factor representing a degradation of the pixel in non-volatile memory;

during operation of the display panel, sampling grey level data of image data for each pixel, and pixel parameter data corresponding to the pixel;

determining an updated correction factor for each pixel as a function of the sampled grey level data and the pixel parameter data; and applying the updated correction factor for each pixel to the image data for the pixel, generating corrected image data for display by the emissive display panel, whereby the updated correction factors are independent of temperature.

2. The method according to claim 1, further comprising:

selecting a plurality of greyscale drive levels representing a portion of a usable greyscale drive level range for the display panel;

for each pixel, measuring the pixel at each predetermined greyscale drive level;

for each of the greyscale drive levels determining an offset value from one of the greyscale drive levels for the pixel which creates a uniform flat field with use of the measurements;

determining a uniformity correction function with use of said determined offset values; and correcting an input drive level for the pixel with use of the uniformity correction function to compensate for said non-uniformity.

3. The method according to claim 2, wherein measuring the pixel comprises taking optical measurements of luminosity with use of at least one of an external optical measurement system and an integrated optical measurement device.

4. The method according to claim 3, wherein the uniform flat field which is created with the determined offset value for each predetermined greyscale drive level comprises a uniform luminosity produced by each of the pixels of the emissive display panel.

5. The method according to claim 2, wherein measuring the pixel comprises taking electrical measurement of an output current of the pixel with use of a monitoring system of the emissive display panel.

6. The method according to claim 5, wherein the uniform flat field which is created with the determined offset value for each predetermined greyscale drive level comprises a uniform current output by each of the pixels of the emissive display panel.

7. The method according to claim 2, wherein determining the offset value comprises iteratively adjusting an initial offset value from the greyscale drive level and repeatedly measuring the pixel until reaching the offset value which creates the uniform flat field.

8. The method according to claim 2, wherein the plurality of greyscale drive levels is two; and wherein the uniformity correction function is a linear uniformity correction function generated from the offset values for each predetermined greyscale drive level.

9. The method according to claim 8, wherein said linear uniformity correction function is a function of said input drive level and the offset values for each predetermined greyscale drive level.

10. The method according to claim 2, wherein the plurality of greyscale drive levels is greater than two; and wherein the uniformity correction function is a piecewise linear uniformity correction function generated from the offset values for each predetermined greyscale drive level, and is a function of said input drive level and the offset values for each predetermined greyscale drive level.

11. The method of claim 2, wherein the plurality of greyscale drive levels is N, which is greater than two; and wherein the uniformity correction function is a curve fit polynomial uniformity correction function of order N−1 or lower generated from the offset values for each predetermined greyscale drive level, and is a function of said input drive level and said offset values for each predetermined greyscale drive level.

12. The method according to claim 1, further comprising storing the updated correction factor in non-volatile memory.

13. The method according to claim 1, wherein the updated correction factor for each pixel is determined according to an OLED degradation model.

14. The method according to claim 1, wherein the updated correction factor for each pixel is further determined as a function of a sampling time period.

15. The method according to claim 1, wherein the updated correction factor for each sub-pixel is determined as a sum of a product of a first function of the sampled grey level data, a second function of a sampling time period, and a third function of the pixel parameter data of each pixel.

16. The method of claim 1, wherein the updated correction factor for each sub-pixel is determined with use of a look-up table, the sampled grey level data, a sampling time period, and the sampled pixel parameter data.

17. A non-uniformity compensation system for compensating for non-uniformity of pixels of an emissive display panel of a host device, each pixel including an organic light-emitting device (OLED), the system comprising:

an image data block;

a non-volatile memory;

the emissive display panel; and a processing unit configured for:

determining an operating temperature of at least one of the pixels periodically at a predetermined time interval;

increasing adjusting a maximum luminance at temperatures above a standard temperature, and decreasing the maximum luminance at temperatures below the standard temperature for the at least one pixel periodically dependent upon the operating temperature based on a predetermined temperature compensating curve resulting in uniform aging of the at least one pixels;

storing for each pixel a correction factor representing a degradation of the pixel in non-volatile memory;

during operation of the display panel, sampling grey level data of the image data received from the image block for each pixel, and pixel parameter data corresponding to the pixel received from the emissive display panel; and determining an updated correction factor for each pixel as a function of the sampled grey level data and the pixel parameter data for each pixel; and a compensation block for applying the updated correction factor for each pixel to the image data for the pixel received from the image data block, generating corrected image data for display by the emissive display panel, whereby the updated correction factors are independent of temperature.

18. The system according to claim 17, wherein the processing unit determines the updated correction factor for each sub-pixel according to an OLED degradation model.

19. The system according to claim 17, wherein the processing unit further determines the updated correction factor for each sub-pixel as a function of a sampling time period.

20. The system according to claim 19, wherein the processing unit determines the updated correction factor for each pixel as a sum of a product of a first function of the sampled grey level data, a second function of a sampling time period, and a third function of the sampled pixel parameter data of each pixel.

* * * * *